United States Patent
Huang et al.

(10) Patent No.: US 7,793,564 B2
(45) Date of Patent: Sep. 14, 2010

(54) PARALLEL MECHANISM HAVING TWO ROTATIONAL AND ONE TRANSLATIONAL DEGREES OF FREEDOM

(75) Inventors: Tian Huang, Tianjin (CN); Haitao Liu, Tianjin (CN)

(73) Assignee: Tianjin University, Tianjin (CN)

( * ) Notice: Subject to any disclaimer, the term of this patent is extended or adjusted under 35 U.S.C. 154(b) by 63 days.

(21) Appl. No.: 11/915,739

(22) PCT Filed: Jan. 25, 2007

(86) PCT No.: PCT/CN2007/000280
§ 371 (c)(1),
(2), (4) Date: Nov. 28, 2007

(87) PCT Pub. No.: WO2007/124637
PCT Pub. Date: Nov. 8, 2007

(65) Prior Publication Data
US 2008/0193241 A1 Aug. 14, 2008

(30) Foreign Application Priority Data
Apr. 30, 2006 (CN) .................. 2006 1 0013608

(51) Int. Cl.
*G05G 11/00* (2006.01)
(52) U.S. Cl. .................. 74/490.07; 409/201
(58) Field of Classification Search .......... 74/490.01, 74/490.03, 490.07, 490.09; 409/200, 201, 409/211, 216
See application file for complete search history.

(56) References Cited

U.S. PATENT DOCUMENTS

| | | | | | |
|---|---|---|---|---|---|
| 4,819,496 | A | * | 4/1989 | Shelef | 74/490.03 |
| 5,715,729 | A | * | 2/1998 | Toyama et al. | 74/490.03 |
| 5,941,128 | A | * | 8/1999 | Toyama et al. | 74/490.06 |
| 6,048,143 | A | * | 4/2000 | Chang et al. | 409/201 |
| 6,135,683 | A | * | 10/2000 | Kim et al. | 409/132 |
| 6,327,929 | B1 | * | 12/2001 | Yanagisawa | 74/490.09 |
| 6,431,802 | B1 | * | 8/2002 | Wahl | 409/201 |
| 6,575,676 | B2 | * | 6/2003 | Wang et al. | 409/201 |
| 6,808,344 | B2 | * | 10/2004 | Chen | 409/201 |
| 2004/0086351 | A1 | * | 5/2004 | Kim et al. | 409/235 |

* cited by examiner

*Primary Examiner*—Richard W Ridley
*Assistant Examiner*—Matthew A Johnson
(74) *Attorney, Agent, or Firm*—George G. Wang; Bei & Ocean

(57) ABSTRACT

A parallel mechanism which has a holding bracket; a movable platform; and three branch joint assemblies of the same structure that are spatially arranged symmetrically about an axis disposed between the holding bracket and the movable platform. Each branch joint assembly has a connecting rod, a linear guide, a driving device and a carriage. The linear guide and the driving device both are secured on the connecting rod. One end of the connecting rod is connected with the movable platform through a hinge having three rotational degrees of freedom. The carriage and the linear guide are connected with each other by a sliding joint, and the carriage is connected with the holding bracket by a hinge having one rotational degree of freedom.

3 Claims, 1 Drawing Sheet

PARALLEL MECHANISM HAVING TWO ROTATIONAL AND ONE TRANSLATIONAL DEGREES OF FREEDOM

FIELD OF THE INVENTION

The invention is directed to a three coordinate's parallel robot mechanism and more particularly, is directed to spatial parallel mechanism capable of achieving two rotational and one translational degrees of freedom.

BACKGROUND OF THE INVENTION

It is known from such as U.S pat. No. 6,431,802 (or W00025976, EP1123175, CA2349579 and DE19850708) that prior art spatial two rotational and one translational parallel mechanism comprises a holding bracket, a movable platform and three branch joint assemblies of the same structure. The branch joint assemblies each consist of five components, i.e., a driving device, a linear guide, a carriage, a hinge and a connecting rod. The parallel mechanism is structurally symmetrical about an axis in space. An end-effector is mounted on the movable platform. The moving direction of the guide is parallel to the symmetrical axis and the carriage is attached to the linear guide via a sliding joint. The connecting rod has its one end connected with the movable platform by a hinge having three rotational degrees of freedom, and has its the other end connected with the carriage through a hinge with a rotational degree of freedom. Both the driving device and linear guide are fixedly disposed on the holding bracket, whereas the carriage is driven by a servo-motor via a ball screw-nut or another linear driving device. In the parallel mechanism utilizing this type of construction, when driven by the servo-motor via the ball screw-nut, each carriage can move independently along the linear guide and accordingly, translation of the movable platform along the symmetrical axis with respect to the holding bracket, as well as rotation thereof about two orthogonal axes perpendicular to the axis are obtained.

In the aforementioned mechanism, as the linear guide is fixed on the holding bracket, a drawback arises: due to the large size of the holding bracket in the moving direction of the guide, high inertia load will be generated during high speed movement of the holding bracket along with the other moving components connected therewith.

SUMMARY OF THE INVENTION

One object of the invention is to overcome the drawbacks of prior art by providing a parallel mechanism having two rotational and one translational degrees of freedom with a greatly reduced size of a holding bracket along the moving direction of a guide.

The parallel mechanism with two spatially rotational and one translational degrees of freedom provided by the instant invention comprises a holding bracket, a movable platform and three branch joint assemblies of the same construction. The three branch joint assemblies are axis-symmetrically disposed as connections between the holding bracket and movable platform. The branch joint assemblies each include a connecting rod, a linear guide, a driving device and a carriage. Both the linear guide and driving device are securely placed on the connecting rod. One end of the connecting rod is connected to the movable platform by means of hinge having three rotational degrees of freedom, while the carriage connects to the linear guide by a sliding joint. Moreover, the carriage is connected to the holding bracket through a hinge having one rotational degree of freedom. The axis direction of the hinge with single rotational degree of freedom is perpendicular to the symmetric axis of respective branch joint assembly, and is also perpendicular to radial direction of a cylinder with the symmetric axis serving as axis of the cylinder.

In the parallel mechanism incorporating two spatial rotational and one translational degrees of freedom according to the invention, due to combination of the connecting rod, driving device and linear guide as one unitary actuating member, and also due to connection of the carriage with the holding bracket by a hinge having only one rotational degree of freedom, a parallel mechanism keeping two spatial rotational and one translational degrees of freedom is thus constructed. Size of the holding bracket along the linear guide can be significantly decreased, as the linear guide and connecting rod are integrally formed in the mechanism. Therefore, same number of degrees of freedom can be attained and same stiffness can be ensured. Furthermore, mass of the entire module is reduced.

DETAILED DESCRIPTION OF THE INVENTION

Figure 1:
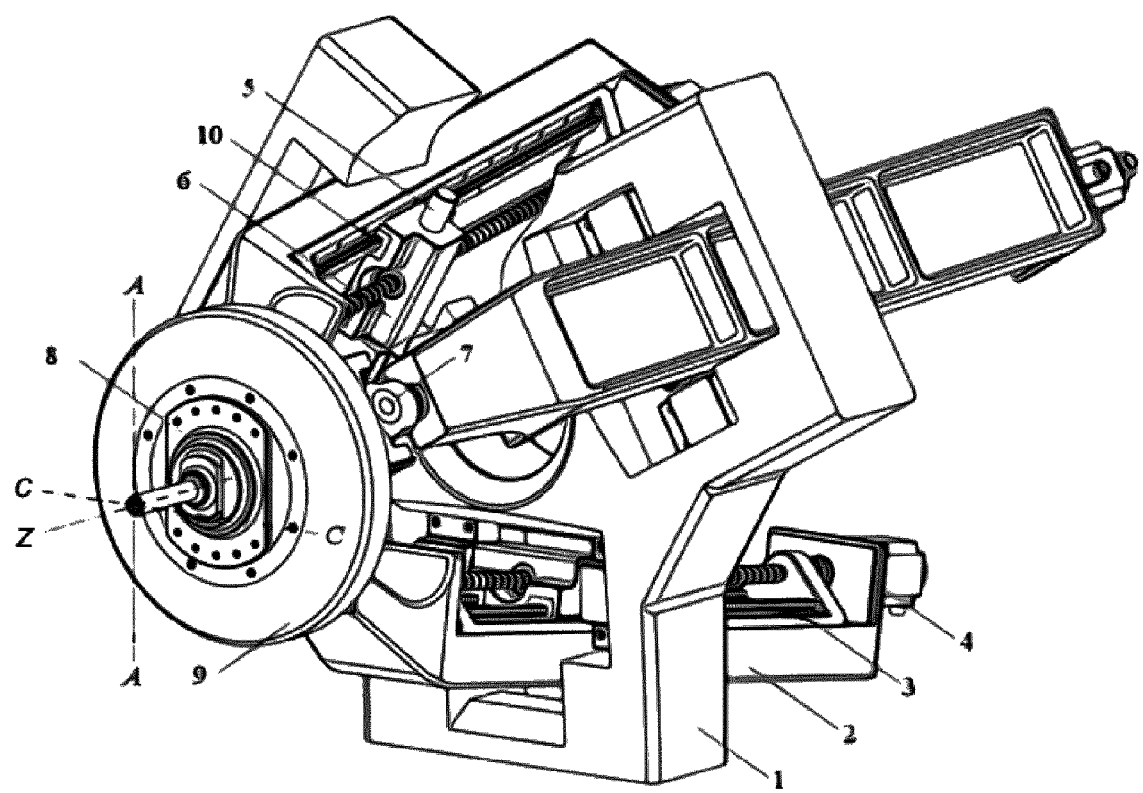
FIG. 1 shows the construction of one embodiment of the invention.

Now detailed description of the invention is made in conjunction with the drawing and embodiments.

The two rotational and one translational parallel mechanism provided by the invention comprises a holding bracket 1, a movable platform 9 and three branch joint assemblies of the same construction uniformly disposed between the holding bracket 1and the movable platform 9 with Z axis as their symmetric axis, as shown in FIG. 1. Each branch joint assembly comprises a connecting rod 2, a linear guide 3, a driving device 4 and a carriage 6. Both the linear guide 3 and the driving device 4 are firmly secured onto the connecting rod 2. The branch joint assembly, the holding bracket 1 and the movable platform 9 are connected with each other by a suitable manner. One end of the connecting rod 2 is connected to the movable platform 9 through a hinge 7 which bears three rotational degrees of freedom and may be a ball hinge. A sliding joint 10 may be used to connect the carriage 6 and the linear guide 3 and in turn, the carriage 6 may be coupled to the holding bracket 1 via a hinge 5 of one rotational degree of freedom. The hinge 5 is structured to have two shafts 5 at both ends of the carriage 6 and in turn, the two shafts 5 are mounted on the holding bracket 1 by means of bearing, thus constructing a rotational joint. The axial direction of the hinge 5 with only one rotational degree of freedom is perpendicular to both the symmetrical axis Z and radial direction of a cylinder having an axis coinciding with the symmetrical axis Z. The movable platform 9 further comprises an electrical spindle 8 disposed thereon securely.

For each branch joint assembly, only three rotational degrees of freedom exist between the connecting rod 2 and the movable platform 9, whilst only one relative translational degree of freedom occurs between the connecting rod 2 and the carriage 6. Furthermore, the carriage 6 can only rotate about the hinge 5 with respect to the holding bracket. As illustrated in FIG. 1, axes A, C and Z are orthogonal with each other. In case where all three branch joint assemblies move in synchronicity, the movable platform 9, along with the electrical spindle 8 fastened thereon can achieve translational movement along the symmetrical axis Z. When only the branch joint assembly located at bottom moves, the movable platform 9, along with the electrical spindle 8 fastened thereon can achieve rotational movement around the symmetrical axis C. When bottom-located branch joint assembly remains stationary while the two branch joint assemblies positioned at the top are moving in opposite directions, the movable platform 9 along with the electrical spindle 8 fastened thereon can achieve rotational movement around the symmetrical axis A.

In the embodiment, the driving device 4 uses a servo-motor via a ball screw-nut structural form to provide a translation degree of freedom of carriage 6 relative to the connecting rod 2. Alternatively, the same translational movement of carriage 6 relative to connecting rod 2 can be achieved by using a linear motor as a driving means. Of course, it is also possible to use other driving means to realize the same movement-function in the embodiment.

The spatial two rotational and one translational parallel mechanism of the present invention differs from conventional spatial two rotational and one translational parallel mechanism in the following aspects:

Firstly, the connecting rod 2 and the linear guide 3 are connected with each other by a fixed connecting means.

Secondly, the connecting rod 2 and the driving device 4 are also connected to each other through a fixed connecting means.

Finally, the carriage 6 and the holding bracket 1 are connected together via the hinge 5 which has only one rotational degree of freedom.

The spatial two rotational and one translational movements of the movable platform 9 with respect to the holding bracket 1 is attained by rotation of three degrees of freedom between the connecting rod 2 and the movable platform 9 of each branch joint assembly, by translational movement of the connecting rod 2 relative to the carriage 6, as well as by rotation of one degree of freedom between the carriage 6 and the holding bracket 1. Meanwhile, the invention is modularly designed as to connect with two orthogonal serial movable components through a mechanical interface in the holding bracket, thereby forming a five-coordinate numerically controlled machining unit both for five-axis numerically controlled machine tool and large structural member.

The above description of the invention and embodiments thereof is not taken in a limiting sense, and what shown in the drawing is merely an exemplary embodiment of the present invention and the actual application of the invention is not limited to the above description. Accordingly, without departing from the spirit of the invention, other constructions and embodiments can be designed by those of ordinary skill in the art by means of other form of holding bracket (including shape and layout), driving mechanism and hinge connecting manner, and shall fall within the scope of the invention.

What is claimed is:

1. A two rotational and one translational parallel mechanism, comprising
    a holding bracket;
    a movable platform; and
    three branch joint assemblies of the same structure that are spatially arranged symmetrically about an axis disposed between the holding bracket and the movable platform, each said branch joint assembly comprising a connecting rod, a linear guide, a driving device and a carriage, wherein the linear guide and the driving device both are secured on the connecting rod; one end of the connecting rod is connected with the movable platform through a hinge having three rotational degrees of freedom; the carriage and the linear guide are connected with each other by a sliding joint, and the carriage is connected with the holding bracket by a hinge having one rotational degree of freedom.

2. The two rotational and one translational parallel mechanism according to claim 1, wherein the driving device of each branch joint assembly comprises a servo-motor having a ball screw-nut structure.

3. The two rotational and one translational parallel mechanism according to claim 1, wherein the driving device of each branch joint assembly comprises a linear motor.

* * * * *